United States Patent
Wang

(10) Patent No.: US 9,182,636 B2
(45) Date of Patent: Nov. 10, 2015

(54) PIXEL CELL AND ACTIVE MATRIX LIQUID CRYSTAL DISPLAY

(71) Applicant: Shenzhen China Star Optoelectronics Technology Co., Ltd., Shenzhen, Guangdong (CN)

(72) Inventor: Jinjie Wang, Shenzhen (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 247 days.

(21) Appl. No.: 13/701,871

(22) PCT Filed: Oct. 25, 2012

(86) PCT No.: PCT/CN2012/083485
§ 371 (c)(1),
(2) Date: Dec. 4, 2012

(87) PCT Pub. No.: WO2014/059688
PCT Pub. Date: Apr. 24, 2014

(65) Prior Publication Data
US 2014/0078437 A1    Mar. 20, 2014

(30) Foreign Application Priority Data

Oct. 18, 2012 (CN) .......................... 2012 1 0397891

(51) Int. Cl.
G02F 1/136       (2006.01)
G02F 1/1343     (2006.01)
G02F 1/1362     (2006.01)

(52) U.S. Cl.
CPC ...... *G02F 1/134336* (2013.01); *G02F 1/13624* (2013.01); *G02F 1/136227* (2013.01)

(58) Field of Classification Search
CPC ................... G02F 1/134336; G02F 1/136227; G02F 1/13624
USPC .................................................... 349/48, 146
See application file for complete search history.

(56) References Cited

U.S. PATENT DOCUMENTS

| | | | | |
|---|---|---|---|---|
| 5,463,483 A * | 10/1995 | Yamazaki | ....................... | 349/41 |
| 2006/0164565 A1* | 7/2006 | Lee et al. | ....................... | 349/43 |
| 2007/0268440 A1* | 11/2007 | Nagano | ....................... | 349/141 |

* cited by examiner

*Primary Examiner* — Charles Chang
(74) *Attorney, Agent, or Firm* — Andrew C. Cheng

(57) ABSTRACT

A pixel cell and an active matrix liquid crystal display are disclosed. The pixel cell includes a first scanning line, a second scanning line, and a thin film transistor set. The thin film transistor set includes a first thin film transistor and a second thin film transistor. The parasitic capacitance $C_{gd}$ of the thin film transistor set satisfies the equation: $C_{gd}=C1+C2$. Wherein the change in capacitance of both c1 and c2 are inverse to each other by the same amount such that summation of a value of capacitance change in both c1 and c2 is equal to zero. In this way, the display detects result from different values of the parasitic capacitance of the pixel cells in different locations are overcome.

13 Claims, 4 Drawing Sheets

PIXEL CELL AND ACTIVE MATRIX LIQUID CRYSTAL DISPLAY

BACKGROUND OF THE INVENTION

1. Field of the Invention

Embodiments of the present disclosure relate to display technology, and more particularly to a pixel cell and an active matrix liquid crystal display (AMLCD).

2. Discussion of the Related Art

FIG. 1 is a schematic view of a typical AMLCD. As shown in FIG. 1, the AMLCD 10 includes a plurality of pixel cells. Each pixel cell includes a thin-film transistor. For example, the pixel cell P1 includes the thin-film transistor T1, and the pixel cell P2 includes the thin-film transistor T2.

In the manufacturing process of the AMLCD 10, the overlay shift may exist between the drain and the gate of the thin-film transistor in different exposure locations due to exposure precision. Thus, the thin-film transistor in different locations may have different parasitic capacitance.

FIG. 2 is an enlarged view of the thin-film transistor T1 and thin-film transistor T2 of FIG. 1. As shown in FIG. 2, the parasitic capacitance generated from the overlay shift of the gate and the source of the thin-film transistor T1 is $C_{gd}1$, and the parasitic capacitance generated from the overlay shift of the gate and the source of the thin-film transistor T2 is $C_{gd}2$. As the overlay areas (shaded portion) of the thin-film transistor T1 and the thin-film transistor T2 are not the same, the gray levels of the pixel cell P1 and that of the pixel cell P2 are not the fame. Thus, the display performance is not good due to Mura effect, image flicker, and so on.

SUMMARY

The object of the claimed invention is to provide a pixel cell and an AMLCD, wherein the values of the parasitic capacitance of the thin-film transistors within each pixel cells of the AMLCD remain unchanged so that the display detects are avoided.

In one aspect, a pixel cell includes: a first scanning line and a second scanning line spaced apart from each other and are parallel to each other a data line crosses the first scanning line and the second scanning line; a pixel electrode electrically connects with the first scanning line, the second scanning line, and the data line; a thin film transistor set electrically connects with the first scanning line, the second scanning line, the data line, and the pixel electrode; the thin film transistor set comprises a first thin film transistor and a second thin film transistor, a parasitic capacitance $C_{gd}$ of the thin film transistor set satisfies the equation: $C_{gd}=C1+C2$, wherein the capacitance generated by the overlay area of the gate and the drain of the first thin film transistor is C1, and the capacitance generated by the overlay area of the gate and the drain of the first thin film transistor is C2, and the change in capacitance of both c1 and c2 are inverse to each other by the same amount such that summation of a value of capacitance change in both c1 and c2 is equal to zero; wherein a gate of the first thin film transistor connects with the first scanning line, a source of the first thin film transistor connects with the data line, a drain of the first thin film transistor electrically connects with the pixel electrode by the first via hole, the gate of the second thin film transistor connects with the second scanning line, the source of the second thin film transistor connects with the data line, the drain of the second thin film transistor electrically connects with the pixel electrode by a second via hole, wherein the first via hole is diagonal to the second via hole; the pixel cells comprise a middle line dividing the pixel cells into two equal portions, the first via hole and the second via hole are respectively arranged at two sides of the middle line, and a vertical distance between the first via hole and the middle line equals to the vertical distance between the second via hole and the middle line.

Wherein the first scanning line and the second scanning line of the pixel cells are connected head-to-tail, and the same scanning driven signals are transmitted on the first scanning line and the second scanning line.

In another aspect, a pixel cell includes: a first scanning line and a second scanning line spaced apart from each other and are parallel to each other; a data line crosses the first scanning line and the second scanning line; a pixel electrode electrically connects with the first scanning line, the second scanning line, and the data line; a thin film transistor set electrically connects with the first scanning line, the second scanning line, the data line, and the pixel electrode; and the thin film transistor set comprises a first thin film transistor and a second thin film transistor, a parasitic capacitance $C_{gd}$ of the thin film transistor set satisfies the equation: $C_{gd}=C1+C2$, wherein the capacitance generated by the overlay area of the gate and the drain of the first thin film transistor is C1, and the capacitance generated by the overlay area of the gate and the drain of the first thin film transistor is C2, and the change in capacitance of both c1 and c2 are inverse to each other by the same amount such that summation of a value of capacitance change in both c1 and c2 is equal to zero.

Wherein a gate of the first thin film transistor connects with the first scanning line, a source of the first thin film transistor connects with the data line, a drain of the first thin film transistor electrically connects with the pixel electrode by the first via hole, the gate of the second thin film transistor connects with the second scanning line, the source of the second thin film transistor connects with the data line, and the drain of the second thin film transistor electrically connects with the pixel electrode by a second via hole.

Wherein the first scanning line and the second scanning line of the pixel cells are connected head-to-tail, and the same scanning driven signals are transmitted on the first scanning line and the second scanning line.

Wherein the first via hole is diagonal to the second via hole.

Wherein the pixel cells comprise a middle line dividing the pixel cells into two equal portions, the first via hole and the second via hole are respectively arranged at two sides of the middle line, and a vertical distance between the first via hole and the middle line equals to the vertical distance between the second via hole and the middle line.

In another aspect, an active matrix liquid crystal display (AMLCD) includes: a non-display area and a display area with a plurality of pixel cells arranged thereon, the pixel cell comprises: a first scanning line and a second scanning line spaced apart from each other and are parallel to each other; a data line crosses the first scanning line and the second scanning line; a pixel electrode electrically connects with the first scanning line, the second scanning line, and the data line; a thin film transistor set electrically connects with the first scanning line, the second scanning line, the data line, and the pixel electrode; and the thin film transistor set comprises a first thin film transistor and a second thin film transistor, a parasitic capacitance $C_{gd}$ of the thin film transistor set satisfies the equation: $C_{gd}=C1+C2$, wherein the capacitance generated by the overlay area of the gate and the drain of the first thin film transistor is C1, and the capacitance generated by the overlay area of the gate and the drain of the first thin film transistor is C2, and the change in capacitance of both c1 and c2 are inverse to each other by the same amount such that summation of a value of capacitance change in both c1 and c2 is equal to zero.

Wherein a gate of the first thin film transistor connects with the first scanning line, a source of the first thin film transistor connects with the data line, a drain of the first thin film transistor electrically connects with the pixel electrode by the first via hole, the gate of the second thin film transistor connects with the second scanning line, the source of the second thin film transistor connects with the data line, and the drain of the second thin film transistor electrically connects with the pixel electrode by a second via hole.

Wherein the first scanning line and the second scanning line of the pixel cells are connected head-to-tail, and the same scanning driven signals are transmitted on the first scanning line and the second scanning line.

Wherein the first via hole is diagonal to the second via hole.

Wherein the pixel cells comprise a middle line dividing the pixel cells into two equal portions, the first via hole and the second via hole are respectively arranged at two sides of the middle line, and a vertical distance between the first via hole and the middle line equals to the vertical distance between the second via hole and the middle line.

Wherein dimensions of the first thin film transistor and the second thin film transistor are adjusted to a dimension of the AMLCD.

DETAILED DESCRIPTION OF THE EMBODIMENTS

Embodiments of the invention will now be described more fully hereinafter with reference to the accompanying drawings, in which embodiments of the invention are shown.

Figure 1:
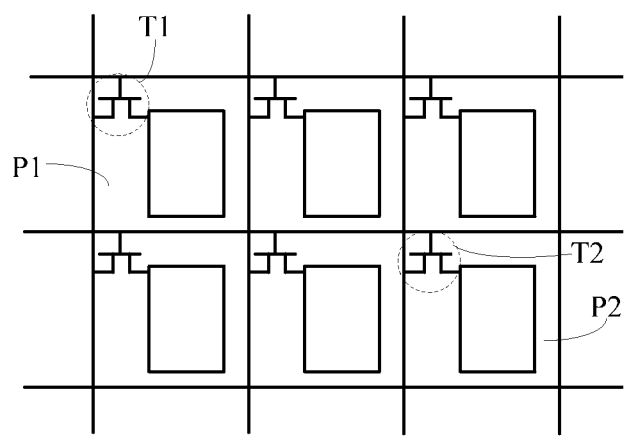
FIG. 1 is a schematic view of a typical AMLCD.
Figure 2:
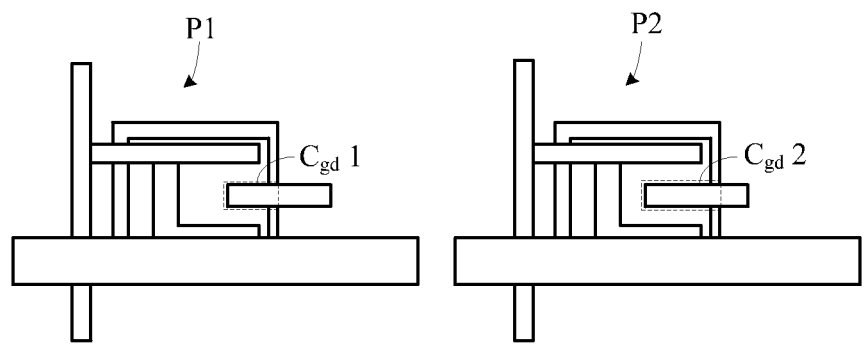
FIG. 2 is an enlarged view of two thin film transistors located in different locations of the AMLCD of FIG. 1.
Figure 3:
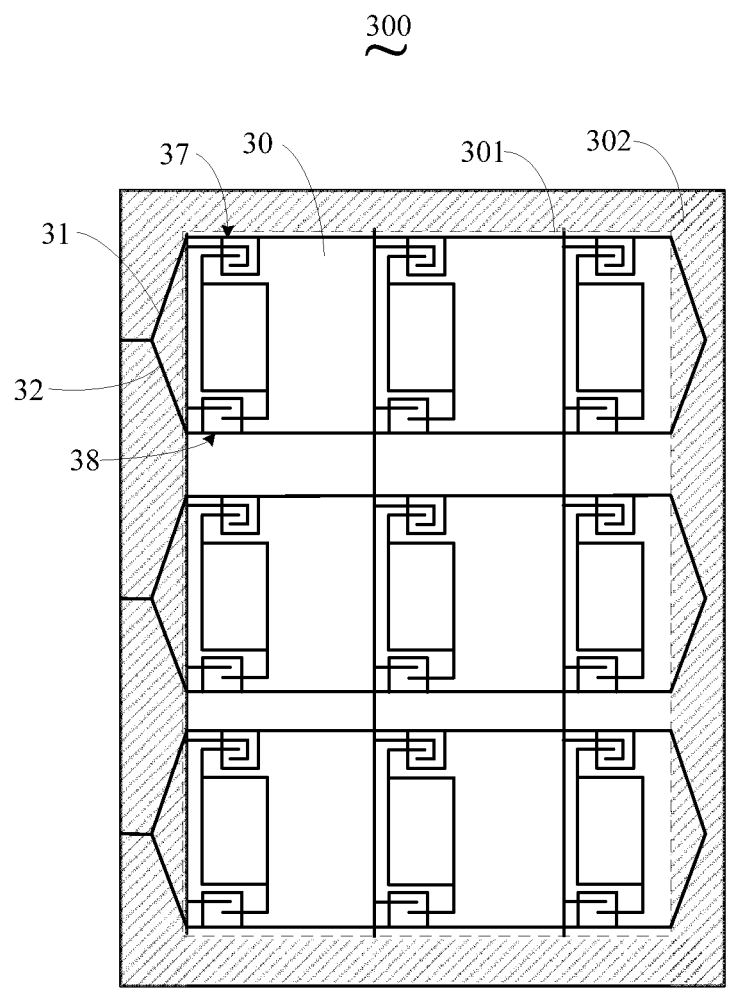
FIG. 3 is a schematic view of the AMLCD in accordance with one embodiment.

FIG. 3 is a schematic view of the AMLCD in accordance with one embodiment. The AMLCD 300 includes a display area 301 and a non-display area 302.

In the embodiment, the display area 301 includes a plurality of pixel cells 30.

Figure 4:
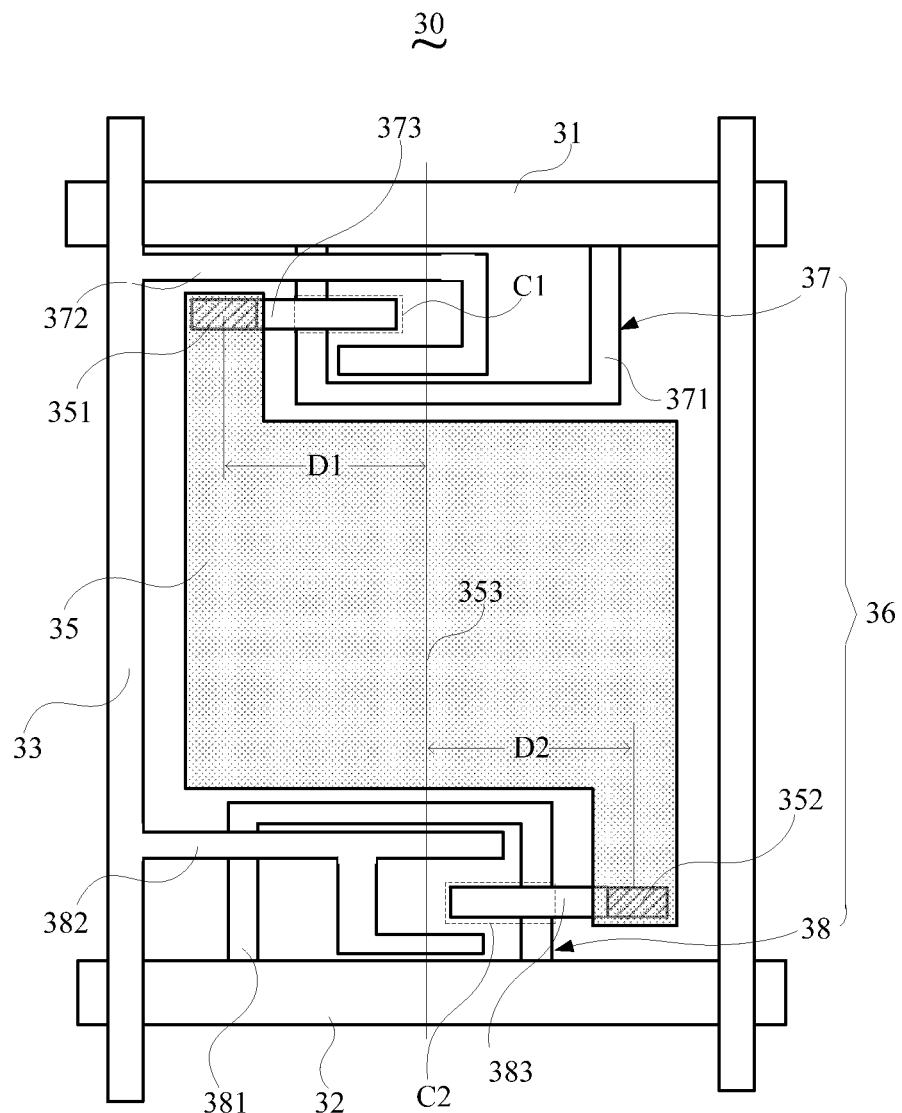
FIG. 4 is a schematic view of one pixel cell of the AMLCD under an ideal exposure scenario.

FIG. 4 is a schematic view of one pixel cell of the AMLCD under an ideal exposure scenario. As shown in FIG. 4, the pixel cells 30 include a first scanning line 31, a second scanning line 32, a data line 33, a pixel electrode 35 and a thin film transistor set 36.

The first scanning line 31 and the second scanning line 32 are arranged spaced apart from each other in the display area 301 and are parallel to each other. The data line 33 respectively crosses the first scanning line 31 and the second scanning line 32 at right angles. The pixel electrode 35 electrically connects with the first scanning line 31, the second scanning line 32, and the data line 33. The thin film transistor set 36 electrically connects with the first scanning line 31, the second scanning line 32, the data line 33, and the pixel electrode 35 respectively.

Specifically, the thin film transistor set 36 includes a first thin film transistor 37 and a second thin film transistor 38. A gate 371 of the first thin film transistor 37 electrically connects with the first scanning line 31, and the gate 381 of the second thin film transistor 38 electrically connects with the second scanning line 32.

A source 372 of the first thin film transistor 37 and a source 382 of the second thin film transistor 38 electrically connect with the data line 33.

A drain 373 of the first thin film transistor 37 electrically connects with the pixel electrode 35 by a first via hole 351. The drain 383 of the second thin film transistor 38 electrically connects with the pixel electrode 35 by a second via hole 352. In the embodiment, the pixel electrode 35 includes a middle line 353 parallel to the data line 33. The middle line 353 divides the pixel cells 30 into two equal portions. The first via hole 351 and the second via hole 352 are respectively arranged at two sides of the middle line 353. The vertical distance D1 between the first via hole 351 and the middle line 353 equals to the vertical distance D2 between the second via hole 352 and the middle line 353. Preferably, the first via hole 351 is diagonal to the second via hole 352.

In the embodiment, the width and the length of the thin film transistor are adjusted according to the dimension of the AMLCD 300. The dimensions of the first thin film transistor 37 and the second thin film transistor 38 of the pixel cells 30 are smaller than that of a typical one when the AMLCD 300 is a small or middle size display. For example, the dimension of the thin film transistors of the AMLCD 300 may be only half of that of the typical one. On the other hand, the dimensions of the first thin film transistor 37 and the second thin film transistor 38 of the pixel cells 30 are increased accordingly when the AMLCD 300 is a large-scale display.

Figure 5:
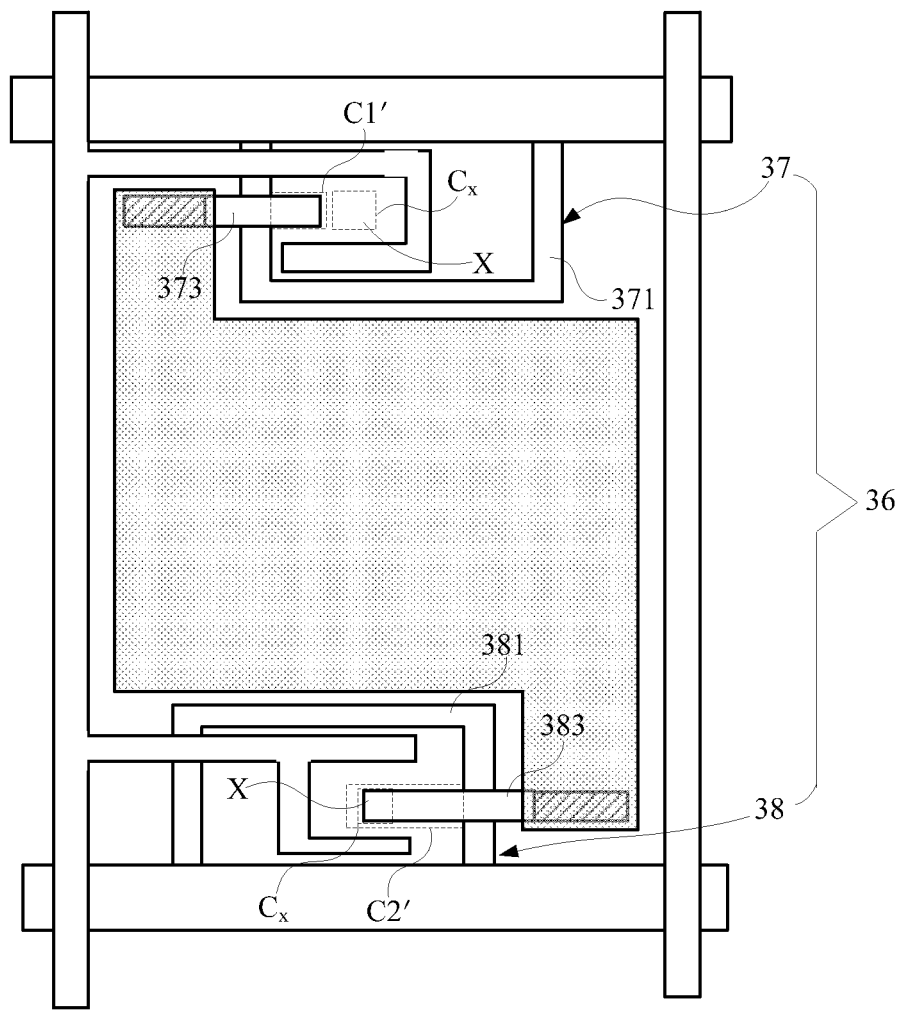
FIG. 5 is a schematic view of the pixel cell of the AMLCD of FIG. 3 when the overlay shift exists.

By arranging two thin film transistors within one pixel cell, the value of the parasitic capacitance within each pixel cells remains unchanged. FIG. 4 is a schematic view of one pixel cell of the AMLCD 300 under an ideal exposure scenario. FIG. 5 is a schematic view of the pixel cell of the AMLCD 300 when the overlay shift exists.

Referring to FIG. 4, when under the ideal exposure scenario, there is no overlay shift when the pixel cells 30 are exposed to an exposure machine. At this time, the capacitance generated by the overlay area of the gate 371 and the drain 373 of the first thin film transistor 37 is C1, and the capacitance generated by the overlay area of the gate 381 and the drain 382 of the first thin film transistor 38 is C2. In addition, a sum of the capacitance C1 and the capacitance C2 is the parasitic capacitance $C_{gd}$ of the thin film transistor set 36. That is, the parasitic capacitance $C_{gd}$ satisfies the equation:

$$C_{gd} = C1 + C2$$

Referring to FIG. 5, in comparison of the pixel cells 30 in FIG. 4, the portion X indicated by the dotted lines is absent from the overlay area of the gate 371 and the source 372 of the first thin film transistor 37. On the other hand, the portion X indicated by the dotted lines is part of the overlay area of the gate 381 and the drain 383 of the second thin film transistor 38. If the capacitance generated by the portion X is $C_x$, the capacitance generated by the overlay area of the gate 37 and the drain 373 of the first thin film transistor 37 is C1', which equals to the difference between the C1 and the Cx. The capacitance generated by the overlay area of the gate 381 and the drain 383 of the second thin film transistor 38 is C2', which equals to the sum of the C2 and the Cx. Therefore, the parasitic capacitance $C_{gd}$ of the thin film transistor set 36 is:

$$C_{gd}' = C1' + C2'(C1 - C_x) + (C2 + C_x) = C1 + C2$$

That is, when the overlay shift exists, the parasitic capacitance $C_{gd}'$ of the thin film transistor set 36 is equal to the parasitic capacitance $C_{gd}$ under the ideal exposure scenario. That is, when the overlay shift exists, the change in capacitance for each of the pixel cells 30 is the same for the reason that the change capacitance of both C1 and C2 are inverse to each other by the same amount such that summation of a value of capacitance change in both c1 and c2 is equal to zero. Thus, display defects result from different values of the parasitic capacitance of the pixel cells 30 in different locations are overcome.

In addition, by arranging two thin film transistors within one pixel cell, the pixel cell is still capable of displaying images when one of the thin film transistors malfunctions.

Furthermore, by arranging the two parallel scanning lines. When one of the scanning lines malfunctions, the scanning driven signals may be transmitted by bypassing the faulty line. Specifically, Referring to FIG. 3, the first scanning line 31 and the second scanning line 32 of the pixel cells 30 are connected head-to-tail in the non-display area. In addition, the same scanning driven signals are transmitted by the two scanning lines. Thus, when one of the scanning lines malfunctions, the scanning driven signals are transmitted by the other scanning line.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A pixel cell, comprising:
a first scanning line and a second scanning line spaced apart from each other and are parallel to each other;
a data line crosses the first scanning line and the second scanning line;
a pixel electrode electrically connects with the first scanning line, the second scanning line, and the data line;
a thin film transistor set electrically connects with the first scanning line, the second scanning line, the data line, and the pixel electrode;
the thin film transistor set comprises a first thin film transistor and a second thin film transistor, a parasitic capacitance Cgd of the thin film transistor set satisfies the equation:

$$C\,gd = C1 + C2$$

wherein the capacitance generated by the overlay area of the gate and the drain of the first thin film transistor is C1, and the capacitance generated by the overlay area of the gate and the drain of the first thin film transistor is C2, and the change in capacitance of both c1 and c2 are inverse to each other by the same amount such that summation of a value of capacitance change in both c1 and c2 is equal to zero;
wherein a gate of the first thin film transistor connects with the first scanning line, a source of the first thin film transistor connects with the data line, a drain of the first thin film transistor electrically connects with the pixel electrode by the first via hole, the gate of the second thin film transistor connects with the second scanning line, the source of the second thin film transistor connects with the data line, the drain of the second thin film transistor electrically connects with the pixel electrode by a second via hole, wherein the first via hole is diagonal to the second via hole;
the pixel cells comprise a middle line dividing the pixel cells into two equal portions, the first via hole and the second via hole are respectively arranged at two sides of the middle line, and a vertical distance between the first via hole and the middle line equals to the vertical distance between the second via hole and the middle line.

2. The pixel cell as claimed in claim 1, wherein the first scanning line and the second scanning line of the pixel cells are connected head-to-tail, and the same scanning driven signals are transmitted on the first scanning line and the second scanning line.

3. A pixel cell, comprising:
a first scanning line and a second scanning line spaced apart from each other and are parallel to each other;
a data line crosses the first scanning line and the second scanning line;
a pixel electrode electrically connects with the first scanning line, the second scanning line, and the data line;
a thin film transistor set electrically connects with the first scanning line, the second scanning line, the data line, and the pixel electrode; and
the thin film transistor set comprises a first thin film transistor and a second thin film transistor, a parasitic capacitance Cgd of the thin film transistor set satisfies the equation:

$$C\,gd = C1 + C2$$

wherein the capacitance generated by the overlay area of the gate and the drain of the first thin film transistor is C1, and the capacitance generated by the overlay area of the gate and the drain of the first thin film transistor is C2, and the change in capacitance of both c1 and c2 are inverse to each other by the same amount such that summation of a value of capacitance change in both c1 and c2 is equal to zero.

4. The pixel cell as claimed in claim 3, wherein a gate of the first thin film transistor connects with the first scanning line, a source of the first thin film transistor connects with the data line, a drain of the first thin film transistor electrically connects with the pixel electrode by the first via hole, the gate of the second thin film transistor connects with the second scanning line, the source of the second thin film transistor connects with the data line, and the drain of the second thin film transistor electrically connects with the pixel electrode by a second via hole.

5. The pixel cell as claimed in claim 4, wherein the first scanning line and the second scanning line of the pixel cells are connected head-to-tail, and the same scanning driven signals are transmitted on the first scanning line and the second scanning line.

6. The pixel cell as claimed in claim 4, wherein the first via hole is diagonal to the second via hole.

7. The pixel cell as claimed in claim 4, wherein the pixel cells comprise a middle line dividing the pixel cells into two equal portions, the first via hole and the second via hole are respectively arranged at two sides of the middle line, and a vertical distance between the first via hole and the middle line equals to the vertical distance between the second via hole and the middle line.

8. An active matrix liquid crystal display (AMLCD), comprising:
a non-display area and a display area with a plurality of pixel cells arranged thereon, the pixel cell comprises:
a first scanning line and a second scanning line spaced apart from each other and are parallel to each other;
a data line crosses the first scanning line and the second scanning line;
a pixel electrode electrically connects with the first scanning line, the second scanning line, and the data line;

a thin film transistor set electrically connects with the first scanning line, the second scanning fine, the data line, and the pixel electrode; and the thin film transistor set comprises a first thin film transistor and a second thin film transistor, a parasitic capacitance Cgd of the thin film transistor set satisfies the equation:

$$Cgd = C1 + C2$$

wherein the capacitance generated by the overlay area of the gate and the drain of the first thin film transistor is C1, and the capacitance generated by the overlay area of the gate and the drain of the first thin film transistor is C2, and the change in capacitance of both c1 and c2 are inverse to each other by the same amount such that summation of a value of capacitance change in both c1 and c2 is equal to zero.

9. The AMLCD as claimed in claim 8, wherein a gate of the first thin film transistor connects with the first scanning line, a source of the first thin film transistor connects with the data line, a drain of the first thin film transistor electrically connects with the pixel electrode by the first via hole, the gate of the second thin film transistor connects with the second scanning line, the source of the second thin film transistor connects with the data line, and the drain of the second thin film transistor electrically connects with the pixel electrode by a second via hole.

10. The AMLCD as claimed in claim 9, wherein the first scanning line and the second scanning line of the pixel cells are connected head-to-tail, and the same scanning driven signals are transmitted on the first scanning line and the second scanning line.

11. The AMLCD as claimed in claim 9, wherein the first via hole is diagonal to the second via hole.

12. The AMLCD as claimed m claim 9, wherein the pixel calls comprise a middle line dividing the pixel cells into two equal portions, the first via hole and the second via hole are respectively arranged at two sides of the middle line, and a vertical distance between the first via hole and the middle line equals to the vertical distance between the second via hole and the middle line.

13. The AMLCD as claimed in claim 8, wherein dimensions of the first thin film transistor and the second thin film transistor are adjusted according to a dimension of the AMLCD.

* * * * *